United States Patent [19]

Yoon et al.

[11] Patent Number: 4,511,623

[45] Date of Patent: Apr. 16, 1985

[54] HIGHLY ORIENTED AROMATIC POLYAMIDE SHORT FIBER

[75] Inventors: Han S. Yoon; Tae W. Son, both of Seoul, Rep. of Korea

[73] Assignee: Korea Advanced Institute of Science and Technology, 200-43, Seoul, Rep. of Korea

[21] Appl. No.: 523,780

[22] Filed: Aug. 16, 1983

[30] Foreign Application Priority Data

Aug. 30, 1982 [KR] Rep. of Korea ............ 3897/1982[U]

[51] Int. Cl.$^3$ .............................................. D02G 3/00
[52] U.S. Cl. .................................... 428/359; 428/364; 428/397; 428/399
[58] Field of Search ............... 428/364, 357, 359, 397, 428/399; 264/8, 9; 528/337

[56] References Cited

U.S. PATENT DOCUMENTS

| | | |
|---|---|---|
| 3,133,138 | 5/1964 | Alexander, Jr. |
| 3,671,542 | 6/1972 | Kwolek et al. |
| 3,869,430 | 3/1975 | Blades |
| 4,048,429 | 9/1977 | Vandenberg ........................... 264/8 |
| 4,162,346 | 7/1979 | Jones, Jr. et al. ................... 428/364 |

FOREIGN PATENT DOCUMENTS

54-27021  3/1979  Japan ...................................... 264/8

OTHER PUBLICATIONS

"Riegel's Handbook of Industrial Chemistry", 8th Edition, Van Nostrand Reinhold Company (1983) pp. 404 through 406.

*Primary Examiner*—Lorraine T. Kendell
*Attorney, Agent, or Firm*—Holman & Stern

[57] ABSTRACT

High oriented poly(p-phenylenetetraphthalamide) short fibers having an inherent viscosity of at least 5.0 and a dimension of 2–12 $\mu$m in diameter and 1000–5000 $\mu$m in length are provided. These fibers have a physical form of irregular cross-sections and needle point-like ends similar to those of natural wood pulp fibers, and crystalline properties such as a crystallinity of more then 50%, an orientation angle of less than 25° and an apparent crystallite size of more that 50 Å as determined from an X-ray diffractogram scan, and a cross-section with four extinction positions through 360° rotation when observed under a polarizing microscope. These fibers are prepared, without spinning steps, by subjecting the molecular chains of poly(p-phenyleneterephthalamide) to mechanical parallelization during the growth of the chains in a polymerization system therefor containing a pyridine/amide-based solvent.

8 Claims, 4 Drawing Figures ial Publication No. 53-294. This Japanese publication
HIGHLY ORIENTED AROMATIC POLYAMIDE SHORT FIBER

FIELD OF THE INVENTION

The present invention relates to novel poly(p-phenyleneterephthalamide) fibers directly prepared during the polymerization of the component polymer of the fibers without employing conventional spinning processes. More particularly, the invention is concerned with novel pulp-like short fibers having high strength and high modulus.

BACKGROUND OF THE INVENTION

In prior art processes of synthetic fibers from their mother polymers, spinning and drawing steps for the orientation of polymer chains are indispensable. That is, in the prior art, after preparing polymers from their monomers through polymerization, the polymers were subjected to melt-spinning or solution-spinning and stretched to parallelize the polymer chains and to form fibers therefrom. Pulp-like short fibers were made of continuous filament fibers by cutting them to a proper length suitable for their application. At present, "KEVLAR 49" (trademark) fibers, which are available from E. I. du Pont de Nemours and Company, Wilmington, Del., U.S.A. and well-known as single commercial products, also seem to be produced through a conventional procedure as above mentioned. That is, according to the teachings of U.S. Pat. No. 3,671,542 to Kwolek et al, poly(p-phenyleneterephthalamide) which is obtained by subjecting p-phenylenediamine and terephthaloyl chloride to solution-polymerization in a polymerization solvent, is separated, washed, dried and dissolved again in a concentrated sulfuric acid solution to make liquid crystal spinning dopes. These dopes are then filtered, spun and dried to fibers. In order to prepare pulp-like fibers, the spun fibers should be cut with a special type of cutting device (Finn & Fram Co., Sun Valley, Calif., U.S.A.; Plastic Compounding, November/December 1981).

SUMMARY OF THE INVENTION

The invention is to provide novel short fibers having evolutional characteristics and performance. The fibers are characterized by having an inherent viscosity of at least 5.0 as measured at a concentration of 0.5 gr. polymer/100 ml concentrated sulfuric acid at 30° C., a dimension of 2 to 12 μm in diameter and 1000 to 5000 μm in length, and a physical form of irregular cross-sections and needle point-like ends. The fibers have crystalline properties, that is, a crystallinity of more than 50%, an orientation angle of less than 25° and an apparent crystallite size of more than 50 Å as determined from an X-ray diffraction scan. The fibers also have a cross-section with four extinction positions through 360° rotation of their cross-section specimen, but without a Maltese cross pattern under crossed polarizers of a polarizing microscope.

DETAILED DESCRIPTION OF THE PREFERRED EMBODIMENTS

Figure 1A:
FIG. 1A is a schematic view of the longitudinal section of fibers of the invention as shown from a scanning electron microscope (300×), illustrating that the fibers are composed of a number of unit cell fibers and have the needle point-like ends similar to those of natural wood pulp fibers.

Fibers of the invention are prepared by subjecting p-phenylenediamine and terephthaloyl chloride to polymerization in the presence of a solvent of a tertiary amide, a metal halide salt and pyridine.

Although fibers of the invention consist essentially of conventional poly(p-phenyleneterephthalamide), it is possible to achieve the object of the invention by employing a new process for the preparation of the polymer which is specially devised for the invention. The process is characterized by being performed in a specially formulated polymerization solvent. In other words, the invention employs p-phenylenediamine and terephthaloyl chloride as starting monomers, but the polymerization solvent used for the polymerization of the monomers is newly formulated so as to enhance the rate of polymerization reaction dramatically. In addition, the invention involves a high mechanical shearing operation for molecular orientation during the rapid growing stage of molecular chains. The production of fibers from this advanced procedure can eliminate a number of troublesome and expensive processes: spinning, stretching, washing, drying and cutting, etc. The fibers thus prepared are short fibers having needle-like sharp ends similar to those of natural wood pulp fibers and superior electric insulation properties as in a paper form because of its sulfuric acid free formulation. The fibers have also superior mechanical performance because of their unusual higher molecular weight and better orientation than existing fibers. Lastly, the fibers have a novel microfibered structure which has never been found in any class of natural or synthetic fibers. The invention enables these fibers to be prepared by a simple step of polymerization reaction based on the technical innovation to be discussed hereinbelow.

According to U.S. Pat. No. 3,063,966 to Kwolek et al., poly(p-phenyleneterephthalamide) is prepared by dissolving p-phenylenediamine in a suitable amide solvent, and then adding highly reactive terephthaloyl chloride to the mixture. However, in order to obtain high molecular weight polymers, a two-stage polymerization reaction is required as disclosed in Japanese Patent Publication No. 53-294. This Japanese publication discloses the use of pyridine, but only as an acid acceptor. The first stage of the reaction comprises forming low molecular weight polymers whose molecules coagulate by a strong affinity of hydrogen bondings between amide bonds. As the molecular coagulation hinders the approach of reactive monomers close to the reactive sites of growing polymer molecules during the polymerization reaction, further molecular growing is practically terminated and the terephthaloyl chloride which has not contributed to the polymer growth undergoes a side reaction with an ambient solvent and hence loses its activity. In order to prepare poly(p-phenyleneterephthalamide) having a higher polymerization degree by a prior art process, the resulting reaction mixture must not be allowed to stand but must undergo a second polymerization stage accompanied by strong mechanical kneading. This strong kneading causes to breakage of hydrogen bondings between molecular chains of poly(p-phenyleneterephthalamide) and increases the mobility of active end groups; this results in formation of polymers of a desired polymerization degree. In the prior art process, therefore, powerful kneaders, such as self-cleaning twinscrew kneaders, should be used. On the contrary, in accordance with this invention, it is possible to simply prepare polymers having twice as high a polymerization degree as compared with that of the polymers from prior art processes, through a polymerization system containing a specially formulated solvent, and to obtain pulp-like short fibers by one step to form fibers in the same polymerization system. In prior art processes it takes an extended period of time, for example, 20 minutes, to complete the polymerization. In the present invention, the polymerization can be completed quickly and within about 20 to about 30 seconds.

These effects are attributable to the employment of a new solvent system having a special composition. The special components of the solvent system make maturing polymer chains keep off each other at a distance sufficient to interfere with the formation of hydrogen bondings between them and endow the reaction system with a passing mobility, so that the active ends of growing polymer molecules can react with the active ends of other monomer molecules. It should be noted that in prior art processes, only strong mechanical kneading can give such mobility to the reaction system physically during the second stage of reaction. However, the special polymerization solvent of the present invention can create the mobility for the system by its chemical action alone. Therefore, in accordance with the invention, when the unit compounds, p-phenylenediamine and terephthaloyl chloride are dissolved in the polymerization solvent which is specially provided for performing the invention, the polymerization degree is rapidly increased by virtue of only stirring the resulting polymerization system for a short period of time ranging from about 10 to 20 seconds. This time period is long enough so that the reactants are thoroughly admixed with each other in the solvent to afford poly(p-phenyleneterephthalamide) with a desired polymerization degree. When poly(p-phenyleneterephthalamide) grows to a certain polymerization degree, the reaction mixture containing the solvent solidifies to a transparent gel-like material. Since such polymerization proceeds in a consistent process without any external aids, polymers with a high polymerization degree can easily be obtained. In addition to the "direct polymerization," the present invention includes the preparation of pulp-like fibers from the polymer, poly(p-phenyleneterephthalamide) by arranging in parallel the polymer chains solely by accelerating the speed of the stirrer during the polymerization. At the final reaction stage of polymer growth, namely, just before the polymer solidifies, the reaction mixture is stirred vigorously for 1 to 5 seconds until the polymer molecular chains can grow sufficiently and be concentrically densified by arranging them around the axis of the stirrer. At the same time, the whole reaction system gelates to form a lump of solid product in which the molecular chains thus arranged can be maintained just as they are. This quick polymerization reaction contributes to the success of the invention. Where the polymer chains have not grown very quickly or the reaction system has not gelated, it is very difficult to arrange the chains desirably. Also, in such an event, even if it is possible to arrange the chains, they are likely to be scattered again by chemical kneading or the fluidity of the system. Therefore, it is absolutely not possible to obtain such a lump gelation by a two-stage reaction as done in prior proceses in which mechanical kneading is necessarily required for enhancing the polymerization degree. The lump produced in accordance with the invention is subjected to washing and then mechanical beating for forming it into usable short fibers. The short fibers may directly be converted into paper for special use. Further features of the invention will be discussed below.

The solvent system in accordance with the invention is a mixture which contains pyridine and an amide solvent as main components. In addition to these components, the solvent may further contain halides of alkali or alkaline earth metals. Preferred amides include hexmethylphosphoramide, N-methylpyrrolidone, tetramethylurea, N,N-dimethylacetamide, N-methylpiperidone, dimethylethyleneurea, tetramethylmalonamide, N-methylcaprolactam, N-acetylpyrrolidone, diethylacetamide, N-ethylpyrrolidone, dimethylpropionamide, dimethylbutylamide, dimethylisobutylamide, and dimethylpropylurea. Among them, hexamethylphosphoramide (HMPA), N-methylpyrrolidone (NMP), tetramethylurea, and N,N-dimethyacetamide (DMAc) and other N-alkylamides are preferably used. Halides of alkali or alkaline earth metals include lithium chloride, calcium chloride, and the like.

The examplary compositions of the solvent, which may be used for the purpose of the invention, include pyridine-HMPA-NMP, pyridine-NMP-LiCl, pyridine-NMP-CaCl$_2$, pyridine-DMAc-LiCl, pyridine-DMAc-CaCl$_2$, and so forth. Instead of pyridine, picoline, quinoline, pyrimidine, pyrazine, quinoxaline, acrylidine, or phenazine may be used. The solvent is preferably composed of 3–50% of pyridine and 97–50% of an amide. A metal halide is added in the proportion of 1–5% based on the total weight of the final mixture. The use of pyridine in a process for the preparation of poly(p-phenyleneterephthalamide) has already been disclosed in prior art patent specifications, such as Dutch Patent specification No. 76.07863 and Japanese Patent Publication Nos. 52-124050 and 53-11994. However, in those references, pyridine does not act as a solvent, but as a mere acid acceptor. Thus, in those patents, pyridine must be added to the reaction mixture, after the polymerization reaction involved is completed, in order to capture the hydrogen chloride produced from the reaction system. It should therefore be understood that there exists a significant difference in the function and effect of pyridine as it was employed in the prior art patents and as it is used in the present invention.

In accordance with the invention, pyridine is added to the polymerization system as a part of the solvent before the polymerization reaction, i.e., before adding terephthaloyl chloride to the system. Hence, the desired polymerization can occur instantaneously by means of simple stirring only, and then the resulting molecular chains can grow to a desired high degree of polymerization. At the same time, a solid reaction mixture can be obtained in which the molecular chains of poly(p- phenyleneterephthalamide) are arranged in the form of fibers. The polymer chain of poly(p-phenyleneterephthalamide) may consistently grow for a certain period of time. Pyridine should be added as a part of the solvent before effecting polymerization of the unit compounds in the amount of about 3-50% by weight of the polymerization solvent in order to prevent growing poly(p-phenyleneterephthalamide) polymer chains to the point of solidification due to coagulation by hydrogen bondings between amide bonds (—CO—NH—) of the molecular chains. Since, in the polymerization system of the invention, pyridine seems to form a complex with terephthaloyl chloride as shown below:

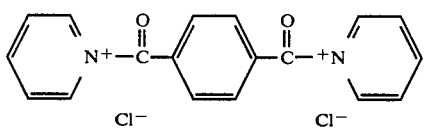

and/or a polar complex with amide bonds of poly(p-phenyleneterephthalamide), the formation of hydrogen bondings between the molecular chains of immature poly(p-phenyleneterephthalamide) may be prevented. Accordingly, mobility and solubility suitable for sufficiently growing the polymer chains are produced and maintained in the polymerization system. As a result, polymerization can be effected rapidly, and the permitted moisture content of the polymerization system can reach up to 700 ppm. This is high as compared with the 100 ppm of the equivalent system in prior art processes. Polymers with a high polymerization degree can thus be obtained even without further stirring or kneading the polymerization reaction mixture.

In a prior art process such as that disclosed in Japanese Patent Publication No. 53-294, pyridine is not added to the polymerization system, or is added as an acid acceptor only after the completion of the polymerization reaction. In this case, since the amide chains of maturing poly(p-phenyleneterephthalamide) are apt to solidify by the action of hydrogen bondings between the molecular chains involved, the polymers may be segregated from the solvent and solidify. For this reason, the active ends of poly(p-phenyleneterephthalamide) are likely to lose the mobility necessary for effecting subsequent reactions and thus the polymer molecular chains can no longer grow by means of mere stirring. In order to continue polymerization in the polymerization system involved, strong mechanical kneading is required. Moreover, to obtain a high degree of polymerization, high speed kneading should be performed for as long as about 100 to about 150 minutes.

In accordance with this invention, the operation of stirring the reaction mixture is effected only briefly and for about 3 to 5 seconds when the viscosity of the mixture reaches to a peak. At that time, the molecular chains of maturing poly(p-phenyleneterephthalamide) are arranged in parallel toward (concentrically with) the rotating direction of the stirrer, forming fiber bundles. As soon as the molecular chains are completely arranged, the entire reaction system solidifies. Once the bundles are formed, they are not separated and/or scattered. In other words, simultaneously with growth of the molecular chains of poly(p-phenyleneterephthalamide) to an enhanced degree of polymerization, the molecular chains are arranged in a certain pattern and the solvent in the polymerization system is uniformly associated between amide groups of the polymer; and the entire reaction system is changed to a gel-like state. This may be proved by the fact that the reaction mixture solidifies despite the fact that a polymer content in the mixture of merely 6-8% of the amount of the solvent is used. In order to arrange the molecular chains, the reaction mixture should be stirred for about 5 to 10 seconds, just before the solification, at a linear velocity of more than 800 cm/sec, i.e., a shear rate of more than 160 sec$^{-1}$ of the impeller of the stirrer, but, without requiring other mechanical treatments.

The stirring/shearing operation for a few seconds in order to produce fibers of the invention may be performed by various methods. When the fibers are formed in a continuous process, a solution of p-phenylenediamine in a polymerization solvent is stoichiometrically admixed with melted terephthaloyl chloride using a counter jet and then the resulting mixture is, before it solidifies, subjected to injection through a narrow slit die at a high velocity. or passed through a tube or blown together with compressed dry air or nitrogen gas so that the arrangement of the molecules can be effected even in the inner portions of the reaction mixture at a high viscosity. In addition, the reaction mixture may preferably be sheared between an elongated rotating axis which rotates at a high speed and the housing for the axis. The resulting polymerized mixture obtained by such shearing is separated from the solvent or allowed to stand for about 4 to about 5 hours to collect the fibers formed. When the mixture is allowed to stand for about 4 to about 5 hours, a higher polymerization degree may be achieved. The polymerization can preferably be carried out in such a manner that the reaction temperature is within the range of from 0° C. to 50° C., preferably 10° C. to 25° C. and the reaction mixture contains the polymer in the amount of about 3 to 10% by weight.

Fiber bundles formed in the polymerized mixture are composed of the fibers textured almost linearly along the shearing direction. In order to obtain pulp-like fibers from the mixture, this mixture may be admixed with a larger amount of an amide solvent such as DMAc, NMP or the like and, then the fibers may be separated mechanically or by exposure to ultrasonic irradiation. Alternatively, the mixture may be admixed with a small amount of water (about 10% of the polymerization solvent) or an aqueous caustic soda solution to coagulate the fibers and then separated as mentioned above. The fibers thus produced have an average dimension of 1-50 mm in length and 2-100 μm in diameter. After being fragmented into individual element fibers, the fibers are separated from the mixture and washed with water. With the fibers in a dispersed state in water, sheet materials such as papers may be prepared.

Figure 1B:
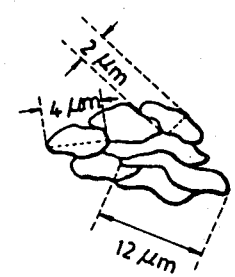
FIG. 1B is a schematic view of the cross-section of fibers of the invention as shown from a scanning electron microscope (300×), illustrating that the fibers have cross sections of various size elliptical shapes.

Fibers which can be prepared in accordance with this invention have a unique structure. FIGS. 1A and 1B schematically illustrate the lateral structure and the cross-section, respectively, of an individual fiber observed from a SEM (Scanning Electron Microscope). From FIG. 1A, it will be noted that fibers of this invention are distinctively differentiated from conventional spun fibers in their structure because the inventive fibers are composed of a plurality of individual unit cell fibers which have the shape of an elongated ribbon and the same needle point-like ends as can be observed in the structure of natural wood pulp fibers. By contrast, conventional artificial fibers and/or pulps have an almost round shape in cross-section and cylindrical ends.

Figure 2A:
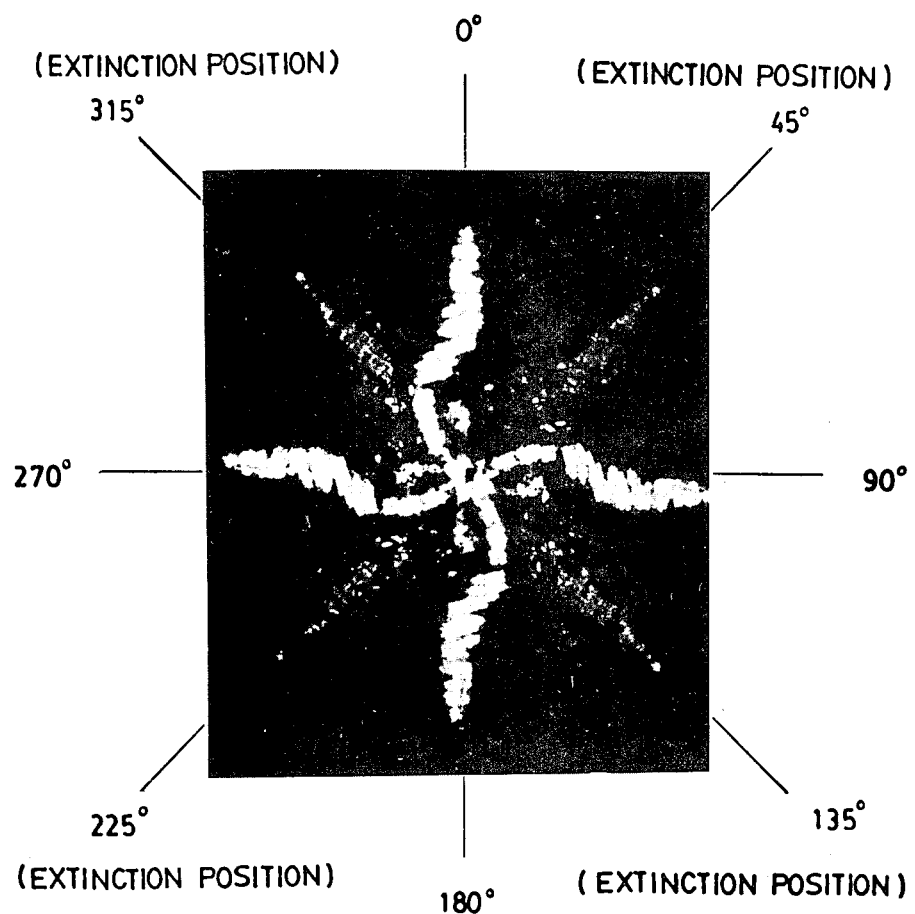
FIG. 2A is a microscopic view of the appearance of the cross-section of fibers of the invention as shown from a polarizing microscope under crossed polarizers by rotating the cross-section specimen through 360°; wherein four extinction positions are illustrated at a rotation angle of 45°.

As can be seen from FIG. 2A, when the cross-section of fibers of the invention is observed by aid of a polarizing microscope (Leitz Ortholux II) under a cross Nicol state, no Maltese cross (which predominently appears in conventional spun fibers) is observed. When a given point of the cross-section of a fiber specimen (0.2 μm in thickness) of the invention is rotated through 360° around the rotating axis of the specimen on a stage under the same microscope, bright and dark positions are alternately detected at every rotating angle of 45°. That is, four extinction positions are present.

Figure 2B:
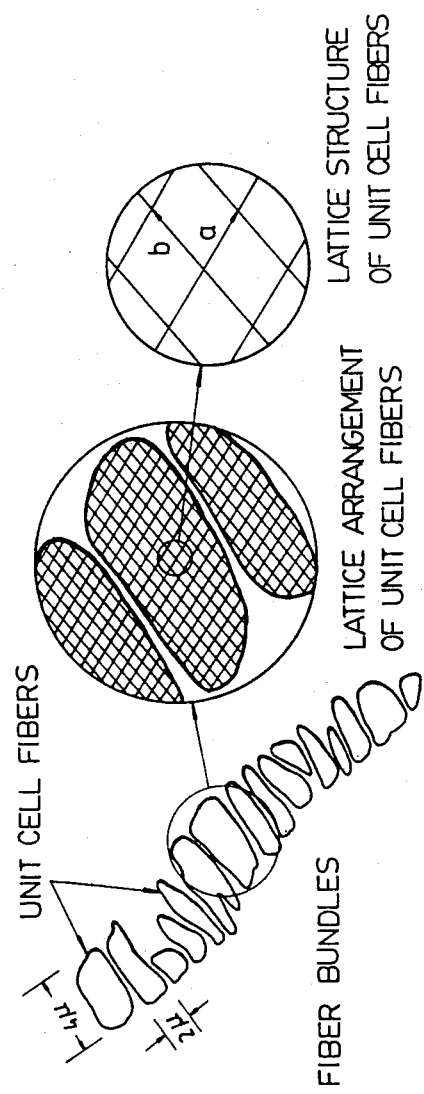
FIG. 2B is a schematic view of microstructural features, of the cross-section of fibers of the invention, illustrating a parallel network structure composed of crystalline microfibrils in the cross-section.

When viewing conventional spun fibers in their cross-section, it is clear that microcrystals of the fibers are radially oriented in perpendicular to the axis of the cross-section (M.E. Dobb, et al., J. Polym. Sci., Polym. Phys. Ed., Vol. 15, 2201, 1977). However, in fibers of the invention, as shown in FIG. 2B, the crystalline orientation shows a peculiar structure which is in the form of a parallelogram network in the direction perpendicular to the axes of the fibers. The evidence of this structural difference is clearly shown by the presence of the extinction position instead of the Maltese cross pattern as aforementioned.

The crystallinity of the fibers of this invention may be determined by means of an X-ray diffractometer following a method described in U.S. Pat. No. 3,869,430 to Blades. The crystallinity and the orientation angle would be above 50% and 25° [(110) plane ($2\theta = 20.5°$)], respectively, based on X-ray diffraction pattern data. Their primary apparent crytallite size is indicated as more than 50 Å based on this data.

As a consequence, it should be noted that the molecular arrangement of fibers of the invention along the fiber axes is markedly different from that of conventional spun fibers. For example, in the molecules forming "KEVLAR 49" fibers (identified above), there is found a significant difference between the molecular arrangement of the outward portion and the core (inward) portion of the fibers. That is, the molecules of the outward portion are arranged in the form of random chain end distribution, while the molecules of the core (inward) portion are arranged in the form of regular plates (2200 Å in thickness) wherein an almost equivalent size of molecular chains are gathered together in parallel. These plates are linked in a row to form fibers. Consequently, it will be noted that breakage in the outward portion takes place in the molecular chains, but in the core (inward) portion breakage occurrs only along the border of the plates, i.e., only between the plates. Since the outward portion, in the case of short fibers of 12.5 μm in diameter, is about 0.1 to 1 μm in thickness, the portion is merely less than 1 to 10% of its whole diameter [C. O. Pruneda, W. J. Sheet, et al., University of California, Polymer Preprint (1981)]. Therefore, the strength per unit diameter of prior art spun fibers decreases precipitously with an increase in fiber thickness. However, the molecules of fibers of this invention are uniformly arranged throughout the outward and the core (inward) portions thereof to produce an ideal molecular arrangement wherein the molecules are constituted with only the same outward portion as in prior art spun fibers. From this point, it will be understood that the strength of fibers of the invention is always very high irrespective of their thickness.

In order to obtain high strength and modulus poly(p-phenyleneterephthalamide) fibers, it is essential first to prepare a high polymerization degree of poly(p-phenyleneterephthalamide) and then to arrange the molecules in parallel to the resulting fiber axis.

The polymerization degree of poly(p-phenyleneterephthalamide) may be expressed by an inherent viscosity (I.V.) value in accordance with the following equation:

$$I.V. = In\eta rel/C$$

wherein ηrel represents relative viscosity; and C represents a concentration of 0.5 grams of polymer in 100 ml. of the solvent expressed in g/dl. The relative viscosity, ηrel is determined by dividing the flow time, in a capillary viscometer, of a dilute solution of the polymer by the flow time of a pure solvent. The dilute solution used herein for determining ηrel is of the concentration expressed by C above. Flow times are determined at 30° C., using concentrated (97%) sulfuric acid as a solvent. An inherent viscosity of about 5.0–5.3 has usually been required for the preparation of prior art high tenacity and high modulus spun fibers; however, fibers of this invention have a comparatively high value of I.V. ranging from 6.0 to 8.0.

It has been reported that the tensile strength of poly(p-phenyleneterephthalamide) fibers having an equivalent molecular arrangement is directly proportional to the I.V. value. It is therefore a natural result that the fibers of this invention possess a higher strength compared with prior art spun fibers.

The general relationship of the I.V. to the tensile strength of poly(p-phenyleneterephthalamide) is as follows:

| I.V. | Tensile Strength (g/denier) |
|---|---|
| 3.0 | 15.5 |
| 4.0 | 21.1 |
| 5.3 | 28.0 |
| 6.0 | 31.7 |
| 7.5 | 39.6 |
| 8.0 | 42.3 |

It has hitherto been found impossible to prepare any fiber having I.V. higher than 6.0, because concentrated sulfuric acid, which was inevitably used in prior spinning procedures, breaks the molecular chains of the polymers formed and such breakage causes reduction of the I.V. value.

Fibers prepared in accordance with this invention are useful for various purposes. Since poly(p-phenyleneterephthalamide) fibers in accordance with the invention have non-fusible and non-flammable properties, the fibers may be substituted for asbestos, which have been useful as heat-resistant materials, and used as fillers for engineering plastics in place of glass fibers.

In addition, fibers of the invention can also be prepared in the form of a sheet material directly from the batch dispersed in water. The sheet material thus prepared may preferably be used as an electric insulator as well as a structural material for a honeycomb-like structure, a helmet, or the like, by impregnating the sheet material with a solution of a matrix resin such as an epoxy.

The following non-limiting examples are illustrative of the practice of the present invention.

EXAMPLE 1

This example illustrates the preparation of high molecular weight poly(p-phenyleneterephthalamide) as well as the preparation of fibers thereof during the polymerization using a mixed solvent of pyridine, lithium chloride, and N,N-dimethylacetamide.

In a 1 L. 4-neck round bottom flask equipped with a thermometer, a nitrogen inlet, and an anchor-type stirrer, a solution of 15 ml (0.18 mole) of pyridine and 6.0 g (0.15 mole) of lithium chloride in 240 ml (2.58 mole) of N,N-dimethylacetamide was prepared. To the solution which was cooled in a water bath, 6.48 g (0.06 mole) of molten p-phenylenediamine was added while stirring. After preparing a p-phenylenediamine solution, the solution was cooled to 25° C. To the p-phenylenediamine solution, 12.24 g (0.06 mole) of powdered terephthaloyl chloride was added all at once while vigorously stirring. When the addition was completed, the resulting mixture became a very viscous solution within a few seconds. When the viscosity of the mixture reached its maximum, the stirrer was operated at a high speed of more than 800 cm/sec for about 5 seconds until the reaction mixture gelated to form a solid mass. After the reaction was completed, the solid reaction mixture was allowed to stand for 5 hours. To obtain fibers similar to pulp, the solid reaction mixture was mixed with a solution of 4.0 g (0.1 mole) of sodium hydroxide in 50 ml of water, and divided into fine fibers using a high-speed mixer. The resulting fibers were filtered and washed several times with water. There was obtained a quantitative yield of pale-yellow, fibrous poly(p-phenyleneterephthalamide), I.V.=7.54.

EXAMPLE 2

This example illustrates an alternative method of obtaining fibers from the same solid reaction mixture as prepared in Example 1.

A solid reaction mixture was prepared as described in Example 1. The solid reaction mixture was mixed with 240 ml of N,N-dimethylacetamide, and divided into fine fibers using a ultrasonic crusher for 7 hours. The fibers thus produced were filtered and washed several times with water. There was obtained a quantitative yield of pale-yellow fibrous poly(p-phenyleneterephthalamide), I.V.=7.19.

EXAMPLE 3

This example illustrates the preparation of high molecular weight poly(p-phenyleneterephthalamide) as well as the preparation of fibers thereof during the polymerization using a mixed solvent of pyridine, calcium chloride, and N,N-dimethylacetamide.

In a 1 L. 4-neck round bottom flask equipped with a thermometer, a nitrogen inlet, and an anchor-type stirrer, a solution of 10 ml (0.12 mole) of pyridine and 6.2 g (0.06 mole) of calcium chloride in 240 ml (2.58 mole) of N,N-dimethylacetamide was prepared. To the solution, which was cooled in a water bath, 6.48 g (0.06 mole) of molten p-phenylenediamine was added while stirring. After preparing a p-phenylenediamine solution, the solution was cooled to 25° C. To the p-phenylenediamine solution, 12.24 g (0.06 mole) of powdered terephthaloyl chloride was added all at once while vigorously stirring. When the addition was completed, the resulting mixture became a very viscous solution within a few seconds. When the viscosity of the mixture reached its maximum, the stirrer was operated at a high speed of more than 800 cm/sec. for about 5 seconds until the reaction mixture gelated to form a solid mass. After the reaction was completed, the solid reaction mixture was allowed to stand for 5 hours. To obtain fibers similar to pulp, the solid reaction mixture was mixed with a solution of 4.0 g (0.1 mole) of sodium hydroxide in 40 ml water and divided into fine fibers with a high-speed mixer. The fibers thus produced were filtered and washed several times with water. There was obtained a quantitative yield of pale-yellow, fibrous poly(p-phenyleneterephthalamide), I.V.=6.54.

EXAMPLE 4

This example illustrates the preparation of high molecular weight poly(p-phenyleneterephthalamide) and the preparation of fibers thereof during the polymerization using a mixed solvent of pyridine, lithium chloride, and N-methylpyrrolidone.

In a 1 L. 4-neck round bottom flask equipped with a thermometer, a nitrogen inlet, and an anchor-type stirrer, a solution of 18 ml (0.21 mole) of pyridine and 7.2 g (0.18 mole) of lithium chloride in 240 ml (2.58 mole) of N-methylpyrrolidone was prepared. To the solution, 6.48 g (0.06 mole) of p-phenylenediamine was added while stirring. After p-phenylenediamine was dissolved completely, the resulting solution was cooled to 25° C. To the p-phenylenediamine solution, 12.24 g (0.06 mole) of powdered terephthaloyl chloride was added all at once while vigorously stirring. When the addition was completed, the resulting mixture became a very viscous solution within a few seconds. When the viscosity of the mixture reached its maximum, the stirrer was operated at a high speed of more than 800 cm/sec. for about 5 seconds until the reaction mixture gelated to form a solid mass. After the reaction was completed, the solid reaction mixture was allowed to stand for 5 hours. To obtain fibers similar to pulp, the solid reaction mixture was mixed with a solution of 4.0 g (0.1 mole) of sodium hydroxide in 50 ml water and divided into fine fibers with a high-speed mixer. The fibers thus obtained were filtered and washed several times with water. There was obtained a quantitative yield of pale-yellow, fibrous poly(p-phenyleneterephthalamide), I.V.=6.21.

EXAMPLE 5

This example illustrates the preparation of high molecular weight poly(p-phenyleneterephthalamide) as well as the preparation of fibers thereof during the polymerization using a mixed solvent of pyridine, calcium chloride, and N-methyl-pyrrolidone.

In a 1 L. 4-neck round bottom flask equipped with a thermometer, a nitrogen inlet, and an anchor-type stirrer, a solution of 15 ml (0.18 mole) of pyridine and 6.2 g (0.06 mole) of calcium chloride in 240 ml (2.58 mole) of N-methylpyrrolidone was prepared. To the solution, 6.48 g (0.06 mole) of p-phenylenediamine was added while stirring. After p-phenylenediamine was dissolved completely, the resulting solution was cooled to 25° C. To the p-phenylenediamine solution, 12.24 g (0.06 mole) of powdered terephthaloyl chloride was added all at once while vigorously stirriing. After the addition was completed, the resulting mixture became a very viscous solution within a few seconds. When the viscosity of the mixture reached its maximum, the stirrer was operated at a high speed of more than 800 cm/sec. for about 5 seconds until the reaction mixture gelated to form a solid mass. After the reaction was completed, the solid reaction mixture was allowed to stand for 5 hours. To obtain fibers similar to pulp, the solid reaction mixture was mixed with a solution of 4.0 g (0.1 mole) of sodium hydroxide in 50 ml water and divided into fine fibers with a high-speed mixer. The fibers thus produced were filtered and washed several times with water. There was obtained a quantitative yield of pale-yellow, fibrous poly(p-phenyleneterephthalamide), I.V.=6.12.

EXAMPLE 6

This example illustrates the preparation of high molecular weight poly(p-phenyleneterephthalamide) as well as the preparation of fibers thereof during the polymerization using a mixed solvent of pyridine, hexamethylphosphoramide, and N-methylpyrrolidone.

In a 1 L. 4-neck round bottom flask equipped with a thermometer, a nitrogen inlet, and an anchor-type stirrer, a mixed solvent of 21 ml (0.24 mole) of pyridine, 80 ml (0.46 mole) of hexamethylphosphoramide and 160 ml (1.72 mole) of N-methylpyrrolidone was prepared. To the mixed solvent, 6.48 g (0.06 mole) of p-phenylenediamine was added while stirring. After p-phenylenediamine was dissolved completely, the solution was cooled to 25° C. To the p-phenylenediamine solution, 12.24 g (0.06 mole) of powdered terephthaloyl chloride was added all at once while vigorously stirring. After the addition was completed, the resulting mixture became a very viscous solution within a few seconds. When the viscosity of the mixture reached its maximum, the stirrer was operated at a high speed of more than 800 cm/sec. for about 5 seconds until the reaction mixture was gelated to form a solid mass. After the reaction was completed, the reaction mixture was allowed to stand for 5 hours. To obtain fibers similar to pulp, the solid reaction mixture was mixed with a solution of 4.0 g (0.1 mole) of sodium hydroxide in 50 ml water and divided into fine fibers with a high-speed mixer. The fibers thus produced were filtered and washed several times with water. There was obtained a quantitative yield of pale-yellow fibrous poly(p-phenyleneterephthalamide), I.V.=6.82.

EXAMPLE 7

This example shows the preparation of poly(p-phenyleneterephthalamide) using a solvent of N,N-dimethylacetamide containing lithium chloride.

In a 1 L. 4-neck round bottom flask equipped with a thermometer, a nitrogen inlet, and an anchor-type stirrer, a solution of p-phenylenediamine (6.48 g; 0.06 mole) and lithium chloride (6.0 g; 0.15 mole) in N,N-dimethylacetamide (240 ml; 2.58 mole) was prepared. To the solution which was cooled to 25° C., powdered terephthaloyl chloride (12.24 g; 0.06 mole) was added all at once while vigorously stirring. Stirring was continued for about 5 minutes. The reaction mixture then changed to powered gel. The reaction mixture was allowed to stand overnight and then was mixed with a large amount of water in a mixer to precipitate the polymer. The product thus isolated was washed several times with water and dried in a vacuum oven to give a light-yellow powdered poly(p-phenyleneterephthalamide), I.V.=2.42. [Contrast with Example 1.]

EXAMPLE 8

This example shows the preparation of poly(p-phenyleneterephthalamide) using a solvent of N-methylpyrrolidone containing lithium chloride.

In a 1 L. 4-neck round bottom flask equipped with a thermometer, a nitrogen inlet, and an anchor-type stirrer, a solution of p-phenylenediamine (6.48 g; 0.06 mole) and lithium chloride (7.2 g; 0.18 mole) in N-methylpyrrolidone (240 ml; 2.58 mole) was prepared. To the solution which was cooled to 25° C., powdered terephthaloyl chloride (12.24 g; 0.06 mole) was added all at once with vigorous stirring. Stirring was continued for about 5 minutes. The reaction mixture then changed to powdered gel. The reaction mixture was allowed to stand overnight and then mixed with a large amount of water in a mixer to precipitate the polymer. The product thus isolated was washed several times with water and dried in a vacuum oven to afford pale-yellow powdered poly(p-phenyleneterephthalamide), I.V.=2.35. [Contrast with Example 4.]

EXAMPLE 9

This example shows the preparation of poly(p-phenyleneterephthalamide) using a mixed solvent of N-methylpyrrolidone and hexamethylphosphoramide.

In a 1 L. 4-neck round bottom flask equipped with a thermometer, a nitrogen inlet, and an anchor-type stirrer, a solution of p-phenylenediamine (6.48 g; 0.06 mole) in a mixture of N-methylpyrrolidone (160 mm; 1.72 mole) and hexamethylphosphoramide (80 ml; 0.46 mole) was prepared. To the solution, which was cooled to 25° C., powdered terephthaloyl chloride (12.24 g; 0.06 mole) was added all at once while vigorously stirring. Stirring was further continued for about 10 minutes. The reaction mixture then changed to powdered gel. The reaction mixture was allowed to stand overnight and then mixed with a large amount of water in a mixer to precipitate the polymer. The product thus isolated was washed several times with water and dried in a vacuum oven, to obtain pale-yellow powdered poly(p-phenyleneterephthalamide), I.V.=3.21. [Contrast with Example 6.]

What is claimed is:

1. A fiber of poly(p-phenyleneterephthalamide) characterized by having:
    a pulp-like short fiber form of about 2–100 μm in diameter and about 1,000–50,000 μm in length;
    irregular cross-sections in a plane taken perpendicular to the fiber length and needle point-like ends similar to those of natural wood pulp fibers;
    an inherent viscosity of at least 5.0 as measured at a concentration of 0.5 g of polymer in 100 ml of 97% concentrated sulfuric acid at 30° C.;
    a crystallinity of more than 50%, an orientation angle of less than 25°, and an apparent crystallite size of more than 50 Angstroms, based upon X-ray diffraction pattern data; and
    a cross-section with four extinction positions through 360° rotation of a cross-sectional specimen of said fiber, reviewed under crossed polarizers of a polarizing microscope.
2. The fiber of claim 1 wherein the inherent viscosity is up to 8.0.
3. The fiber of claim 2 wherein the inherent viscosity is at least 7.5.
4. The fiber of claim 1 wherein the inherent viscosity is from 6.0 to 8.0.
5. The fiber of claim 1 wherein the inherent viscosity is from 6.12 to 7.54.
6. The fiber of claim 1 wherein the fiber diameter is 2–12 μm and fiber length is 1,000–5,000 μm.
7. A plurality of the fibers of claim 1 formed into a sheet material.
8. A plurality of the fibers of claim 1 used as a heat resistant material.

* * * * *